United States Patent
Smith et al.

(10) Patent No.: US 10,155,328 B2
(45) Date of Patent: Dec. 18, 2018

(54) CURING TOOL

(71) Applicant: Integration Technology Limited, Oxfordshire (GB)

(72) Inventors: Jason Smith, Oxfordshire (GB); Adrian Lockwood, Oxfordshire (GB)

(73) Assignee: Integration Technology Limited (GB)

( * ) Notice: Subject to any disclaimer, the term of this patent is extended or adjusted under 35 U.S.C. 154(b) by 0 days.

(21) Appl. No.: 15/622,224

(22) Filed: Jun. 14, 2017

(65) Prior Publication Data

US 2017/0361506 A1 Dec. 21, 2017

(30) Foreign Application Priority Data

Jun. 15, 2016 (GB) .................................. 1610402.8

(51) Int. Cl.
| | |
|---|---|
| B29C 35/08 | (2006.01) |
| F16L 55/18 | (2006.01) |
| H05B 3/00 | (2006.01) |
| G21K 5/10 | (2006.01) |
| B29L 23/00 | (2006.01) |

(52) U.S. Cl.
CPC .......... *B29C 35/0805* (2013.01); *F16L 55/18* (2013.01); *G21K 5/10* (2013.01); *H05B 3/0057* (2013.01); *B29C 2035/0822* (2013.01); *B29C 2035/0827* (2013.01); *B29C 2035/0833* (2013.01); *B29L 2023/22* (2013.01)

(58) Field of Classification Search
CPC ........ B29C 35/0805; B29C 2035/0822; B29C 2035/0827; G21K 5/06; G21K 5/08; G21K 5/10; B29L 2023/22
See application file for complete search history.

(56) References Cited

U.S. PATENT DOCUMENTS

| | | | | |
|---|---|---|---|---|
| 5,616,141 A | * | 4/1997 | Cipolla ................ | A61C 1/0046 433/141 |
| 6,102,696 A | * | 8/2000 | Osterwalder ........ | A61C 19/004 433/229 |
| 2002/0172913 A1 | | 11/2002 | Cao | |
| 2002/0172916 A1 | * | 11/2002 | Cao ...................... | A61C 19/004 433/29 |
| 2003/0001507 A1 | * | 1/2003 | Cao ...................... | A61C 19/004 315/56 |
| 2003/0170151 A1 | | 9/2003 | Hunter | |

(Continued)

FOREIGN PATENT DOCUMENTS

| | | |
|---|---|---|
| DE | 102007 038197 | 2/2009 |
| EP | 1959183 A | 8/2008 |

(Continued)

*Primary Examiner* — David E Smith
(74) *Attorney, Agent, or Firm* — Skinner and Associates; Joel Skinner

(57) ABSTRACT

A curing tool is described that comprises a tool body 12 having an end wall generally perpendicular to an axis 14 of the tool body 12, the tool being arranged to be moved, in use, in substantially the direction of the axis 14, an array 16 of LEDs carried by the tool body 12, the LEDs being arranged to emit light in a direction generally parallel to the axis 14, and a reflector 18 carried by the tool body 12 and arranged to reflect light emitted from the LEDs and incident upon the reflector 18 such that the reflected light is reflected in a direction generally perpendicular to the axis 14.

15 Claims, 1 Drawing Sheet

(56) References Cited

U.S. PATENT DOCUMENTS

| | | | |
|---|---|---|---|
| 2007/0275344 A1* | 11/2007 | Liu | A61C 19/004 |
| | | | 433/29 |
| 2009/0175977 A1 | 7/2009 | Kuzusako | |
| 2009/0208894 A1* | 8/2009 | Orloff | A61C 19/004 |
| | | | 433/29 |
| 2010/0308510 A1 | 12/2010 | Reutemann | |
| 2014/0175307 A1* | 6/2014 | Arnold | H01J 61/40 |
| | | | 250/492.1 |
| 2015/0273761 A1 | 10/2015 | Safai | |

FOREIGN PATENT DOCUMENTS

| | | | | |
|---|---|---|---|---|
| EP | 1959183 A1 * | 8/2008 | | F16L 55/165 |
| EP | 2739894 B | 6/2014 | | |
| JP | 2009083251 A | 4/2009 | | |

* cited by examiner

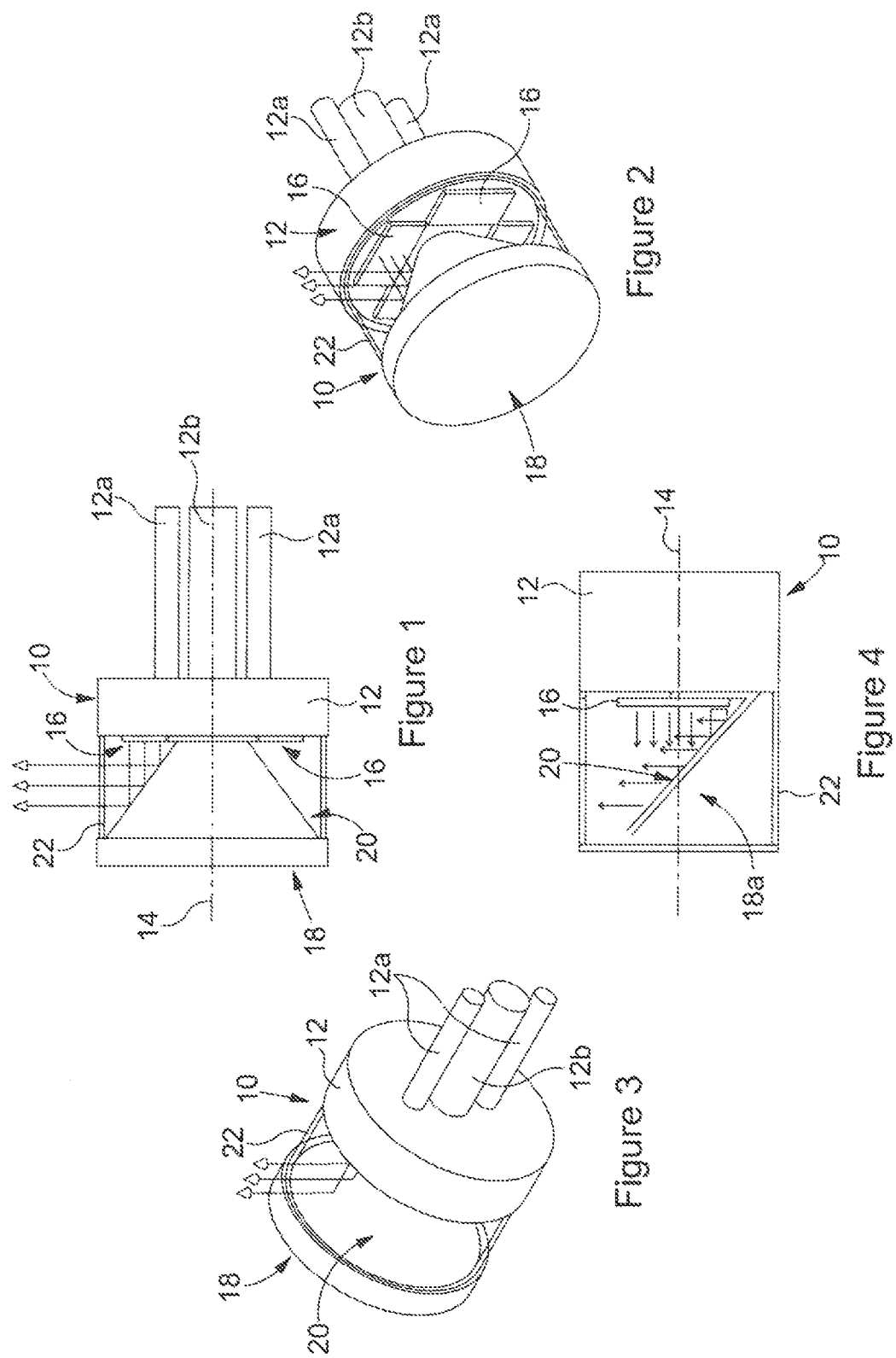

CURING TOOL

This invention relates to a curing tool, and in particular to a curing tool by which a material may be cured by exposure of the material to electromagnetic radiation of a predetermined wavelength or wavelength range. In particular, the invention relates to a tool whereby materials applied to the inner surface of an item may be cured.

A number of curing devices are known and are in widespread use, for example for use in the curing of resins, printing inks and a number of other materials. The devices typically operate by being arranged to emit electromagnetic radiation of a predetermined wavelength or wavelength range towards to the material to be cured. Commonly, light in the ultra violet wavelength range is used. However, depending upon the material to be cured, other wavelengths may be employed. By way of example, visible light, infrared or near infrared light may be used.

One application in which it is desired to be able to cure a material in a convenient manner is in the refining of underground pipes. Where a pipe requires relining, for example to reduce leakage therefrom, then it is known to push or pull a tool through the pipe that operates to spray or otherwise apply a suitable resin material to the inner surface of the wall of the pipe, or a pre-coated liner sleeve may be inserted within the pipe. Subsequently, a device is pulled or pushed through the pipe to irradiate the material to cure the material. The application of the resin and the curing function may, if desired, be undertaken by a single tool.

EP2129958 describes a device that may be employed in the curing of the material, it comprises a body of generally cylindrical form, the outer peripheral surface of which is provided with an array of LEDs operable to emit ultra violet light in a radial direction to irradiate the material and thereby achieve curing.

It is an object of the invention to provide a curing tool of relatively simple and convenient form.

According to the invention there is provided a curing tool comprising a tool body having an end wall generally perpendicular to an axis of the tool body, the tool being arranged to be moved, in use, in substantially the direction of the axis, an array of LEDs carried by the tool body, the LEDs being arranged to emit light in a direction generally parallel to the axis, and a reflector carried by the tool body and arranged to reflect light emitted from the LEDs and incident upon the reflector such that the reflected light is reflected in a direction generally perpendicular to the axis.

It will be appreciated that the LEDs of the array may each emit light over a range of angles, and hence at least some of the light emitted from the LEDs may be emitted in a direction not truly parallel to the axis. Likewise, at least some of the light reflected from the reflector may not be truly perpendicular to the axis. The expressions 'generally parallel' and 'generally perpendicular' should be interpreted accordingly herein.

The reflector may be fixed relative to the body. By way of example, it may be of generally conical form. If desired, it may be geometrically shaped to focus the reflected light, for example having a reflective peripheral surface of generally parabolic conical form.

Alternatively, the reflector may be movably mounted, for example being arranged to rotate about the axis, such that the reflected light is scanned around the tool as the reflector rotates.

The tool may further comprise a window through which the reflected light is transmitted. Such an arrangement is advantageous in that the LEDs and reflector are located within a protected environment. The window, whilst being transparent to the wavelength emitted by the LEDs may, if desired, be opaque to other wavelengths.

Where a window is provided, it may take the form of a lens, serving to focus the light transmitted through the window onto a material to be cured. By way of example, the window may serve as a Fresnel lens or the like.

If desired, the tool may include an additional array of LEDs and an additional reflector axially spaced from the aforementioned array and reflector.

Depending upon the material to be cured, the LEDs may be arranged to emit ultraviolet light. Alternatively, visible light, infrared light or near infrared light may be emitted.

The invention will further be described, by way of example, with reference to the accompanying drawings, in which:

FIGS. 1, 2 and 3 are views illustrating a curing tool in accordance with one embodiment of the invention; and FIG. 4 is a view illustrating, diagrammatically, an alternative embodiment.

Referring to the accompanying drawings, a curing tool 10 is illustrated. The tool 10 comprises a body 12 defining an axis 14. The body 12 is of disc-like shape, and defines an end wall. Arrays 16 of LEDs are mounted upon the end wall of the body 12, the arrays 16 of LEDs being arranged to emit light in a direction generally parallel to the axis 14. The LEDs of each array 16, in this embodiment, are of the type that emits ultra violet light. It will be appreciated, however, that this need not always by the case and that other types of LED may be used in some circumstances. Whilst several arrays 16, each being of generally rectangular form, are shown, it will be appreciated that the number of arrays 16 may be changed, and that the shape of the arrays 18 may differ from the form shown.

The body 12 includes connections 12a whereby a coolant, for example in the form of water or another liquid, or in the form of a suitable gas, can be supplied to coolant passages provided in the body 12, to cool the body 12 and the LEDs mounted thereon, and whereby the warmed coolant can be conducted to a remote location. An electrical junction 12b is also provided whereby power and control signals can be supplied to the LEDs and associated control circuits of the arrays 16.

Whilst the LEDs are arranged to emit light in a direction generally parallel to the axis 14, it will be appreciated that at least some of the light may be transmitted in directions angled to the axis. In practise, it is envisaged that little, if any, light will be emitted in a direction angled to the axis at an angle greater than, for example, 20 degrees. The expression 'generally parallel to the axis 14' should be interpreted accordingly.

The tool 10 further comprises a reflector 18 mounted upon and carried by the body 12. The reflector 18 includes a reflective surface 20 at which light incident thereon emitted from the LEDs of the arrays 16 is reflected in a direction generally perpendicular to the axis 14. As with the direction in which the light is emitted from the LEDs, it will be appreciated that at least some of the light reflected from the reflector may be reflected in a direction that is not truly perpendicular to the axis 14, but it is envisaged that the reflected light will propagate, primarily, in a substantially radial direction angled between, for example, 70 degrees and 110 degrees relative to the axis 14.

The reflector 18 is of generally conical form, the axis of which is aligned with the axis 14. In the arrangement shown, the surface 20 is of substantially constant cone angle, but it could alternatively take the form of a concave parabolic or hyperbolic cone and thus be of varying cone angle. It will be appreciated that light reflected from different parts of the reflector 18 will propagate in different substantially radial directions. Where of non-constant cone angle, the reflector 18 may, in addition to serving to direct the light incident thereon in a generally radial direction, also serve to focus the reflected light. However, it will be appreciated that other forms of reflector 18 may be used without departing from the scope of the invention. By way of example, as shown, a conical reflector of constant cone angle may be used, or the reflector may be arranged to disperse rather than focus the reflected light.

A cylindrical window or sleeve 22 is provided between the outer periphery of the reflector 18 and the outer periphery of the body 12, the window 22 protecting the reflective surface 20 of the reflector 18 and the arrays 16 of LEDs. The window 22 is of a material that is transparent at least to the wavelengths emitted by the LEDs.

If desired, the window 22 may be shaped or otherwise formed in such a manner as to act as a lens, focussing the light transmitted through the window 22 onto the wall of the pipe. By way of example, the window 22 may be provided with formations resulting in the window 22 serving as a Fresnel lens or the like. However, it will be appreciated that other lens formations may be used.

In use, the tool 10 may be used in the curing of resin materials applied to the inner surface of the wall of a pipe during a relining operation. After application of the resin to the wall of the pipe, the tool 10 is pushed, pulled or otherwise driven through the pipe. The LEDs of the arrays 16 are operated to emit ultra violet light, the light being emitted in a forward direction, generally parallel to the axis 14 of the tool 10. Operation of the LEDs is controlled via an umbilical attached at the junction 12b, and the LEDs are cooled using the coolant supplied via the connections 12a. The light is incident upon and reflected by the reflector 18, the reflected light propagating in a direction generally perpendicular to the axis 14, ie in a generally radial direction towards the surface of the pipe. The reflected light is transmitted through the window 22 interacts with the resin material in such a manner as to aid curing thereof.

The curing tool 10 may form part of the tool used to apply the resin, if desired.

The design of the reflector 18 and the arrangement of the arrays 16 of LEDs are conveniently such that the resin material is substantially uniformly irradiated as the tool 10 is moved along the pipe. However, depending upon the application in which the tool is to be used, it may be preferred to achieve a non-uniform pattern of irradiation.

Whilst the tool 10 includes a single reflector 18 and associated arrays 16 of LEDs, it will be appreciated that if desired, the tool 10 may include one or more additional reflectors 18 and associated arrays of LEDs axially spaced from the reflector 18 and arrays 16.

If desired, the tool 10 may be adapted for rotation about its axis 14.

FIG. 4 illustrates an alternative to the arrangement described hereinbefore. In the arrangement described hereinbefore, the reflector 18 serves to evenly reflect the emitted ultra violet light about the periphery of the tool 10. In the arrangement of FIG. 4, a rotatable reflector 18a is provided, a motor (not shown) being provided and arranged to drive the reflector 18a for rotation about the axis 14. In use, the reflector 18a reflects the light incident thereon from the array of LEDs 18 such that the reflected light propagates in a generally radial direction, the rotation of the reflector 18 causing the reflected light to be scanned about the periphery of the tool 10 to substantially uniformly irradiate, for example, the inner surface of a wall of a pipe.

Whilst the description hereinbefore is of a tool suitable for use in curing a material applied to the inner surface of a pipe, it will be appreciated that the tool may be used in other applications in which it is desired to irradiate a material located within an enclosed space to achieve curing thereof. As mentioned hereinbefore, the nature of the array of LEDs may be modified such that the light emitted therefrom is of a wavelength selected to aid curing of the particular material to be cured. By way of example, in such arrangements it may be preferred to use LEDs arranged to emit visible light, infrared light or near infrared light.

Whilst specific embodiments have been described hereinbefore, it will be appreciated that a wide range of modifications or alterations may be made to the tool described hereinbefore without departing from the scope of the invention as defined by the appended claims.

The invention claimed is:

1. A curing tool comprising a tool body having an end wall generally perpendicular to an axis of the tool body, the tool being arranged to be moved, in use, in substantially the direction of the axis, an array of LEDs carried by the tool body, the LEDs being arranged to emit light in a direction generally parallel to the axis, and a reflector carried by the tool body and arranged to reflect light emitted from the LEDs and incident upon the reflector such that the reflected light is reflected in a direction generally perpendicular to the axis, wherein the reflected light is reflected generally uniformly about substantially the full circumference of the body.

2. A tool according to claim 1, wherein the reflector is fixed relative to the body.

3. A tool according to claim 2, wherein the reflector is of generally conical form.

4. A tool according to claim 3, wherein a reflective surface of the reflector is of generally hyperbolic conical form.

5. A tool according to claim 1, wherein the reflector is movably mounted upon the tool body.

6. A tool according to claim 5, wherein the reflector is arranged to rotate about the axis, such that the reflected light is scanned around the tool as the reflector rotates.

7. A tool according to claim 1, wherein the reflector is shaped to focus the reflected light.

8. A tool according to claim 1, further comprising a window through which the reflected light is transmitted.

9. A tool according to claim 8, wherein the window takes the form of a lens, serving to focus the light transmitted through the window onto a material to be cured, in use.

10. A tool according to claim 9, wherein the lens comprises a Fresnel lens.

11. A tool according to claim 1, further comprising an additional array of LEDs and an additional reflector axially spaced from the aforementioned array and reflector.

12. A tool according to claim 1, wherein the array of LEDs is arranged to emit ultraviolet light, visible light, infrared light or near infrared light.

13. A tool according to claim 1, wherein the body is adapted to rotate about its axis.

14. A curing tool comprising a tool body having an end wall generally perpendicular to an axis of the tool body, the tool being arranged to be moved, in use, in substantially the direction of the axis, an array of LEDs carried by the tool body, the LEDs being arranged to emit light in a direction generally parallel to the axis, and a reflector carried by the tool body and arranged to reflect light emitted from the LEDs and incident upon the reflector such that the reflected light is reflected in a direction generally perpendicular to the axis, wherein the reflector is fixed relative to the body, the reflector being of generally conical form and a reflective surface of the reflector is of generally hyperbolic conical form.

15. A curing tool comprising a tool body having an end wall generally perpendicular to an axis of the tool body, the tool being arranged to be moved, in use, in substantially the direction of the axis, an array of LEDs carried by the tool body, the LEDs being arranged to emit light in a direction generally parallel to the axis, and a reflector carried by the tool body and arranged to reflect light emitted from the LEDs and incident upon the reflector such that the reflected light is reflected in a direction generally perpendicular to the axis, wherein the reflector is movably mounted upon the tool body, the reflector being arranged to rotate about the axis, such that the reflected light is scanned around the tool as the reflector rotates.

\* \* \* \* \*